(12) United States Patent
Nakajima

(10) Patent No.: US 7,086,985 B2
(45) Date of Patent: Aug. 8, 2006

(54) DIFFERENTIAL GEAR DEVICE FOR VEHICLE

(75) Inventor: Shinichiro Nakajima, Niiza (JP)

(73) Assignee: Toyoda Machine Works, LTD, Kariya (JP)

( * ) Notice: Subject to any disclaimer, the term of this patent is extended or adjusted under 35 U.S.C. 154(b) by 157 days.

(21) Appl. No.: 10/511,197

(22) PCT Filed: Apr. 18, 2003

(86) PCT No.: PCT/JP03/04936

§ 371 (c)(1),
(2), (4) Date: Oct. 12, 2004

(87) PCT Pub. No.: WO03/089811

PCT Pub. Date: Oct. 30, 2003

(65) Prior Publication Data

US 2005/0130786 A1 Jun. 16, 2005

(30) Foreign Application Priority Data

Apr. 22, 2002 (JP) ............................. 2002-118973

(51) Int. Cl.
*F16H 48/06* (2006.01)

(52) U.S. Cl. .................................................... 475/248

(58) Field of Classification Search ................ 475/248, 475/338
See application file for complete search history.

(56) References Cited

U.S. PATENT DOCUMENTS

| 4,535,651 | A | * | 8/1985 | Chambers | .................... 475/234 |
| 5,030,185 | A | * | 7/1991 | Kawamura | .................. 475/227 |
| 6,620,074 | B1 | * | 9/2003 | Kanazawa et al. | .......... 475/248 |

FOREIGN PATENT DOCUMENTS

| JP | 63-047539 | 2/1988 |
| JP | 03-168448 | 7/1991 |
| JP | 05-052240 | 3/1993 |
| JP | 09-112657 | 5/1997 |

* cited by examiner

*Primary Examiner*—Dirk Wright
(74) *Attorney, Agent, or Firm*—Thomas B. Ryan; Stephen B. Salai, Esq.; Harter, Secrest & Emery LLP

(57) ABSTRACT

An internal gear 4 and a sun gear 5 are arranged on one end side and the other end side within a housing 1 which is driven for rotation about a rotation axis L. The internal gear 4 and the sun gear 5 are rotatably disposed about the rotation axis L. A first gear part 61 and a second gear part 62, which are different from each other in number of teeth, are formed on one end part and the other end part of a planetary gear 6, respectively. The first gear part 61 is meshed with an internal gear part 42 of the internal gear 4. The second gear part 62 is meshed with an external gear part 51 of the sun gear 5.

9 Claims, 3 Drawing Sheets

DIFFERENTIAL GEAR DEVICE FOR VEHICLE

TECHNICAL FIELD

This invention relates to a differential gear apparatus for vehicles in which a planetary gear mechanism is utilized.

BACKGROUND ART

In general, a differential gear apparatus of this type comprises an internal gear and a sun gear rotatably arranged with their axes aligned with each other, a carrier rotatably arranged with its axis aligned with the axes of the internal gear and the sun gear, and a planetary gear rotatably (rotatably about its own axis) supported by the carrier and meshed with the internal gear and the sun gear. When the carrier is driven for rotation, its rotation is transmitted to the internal gear and the sun gear through the planetary gear. When the planetary gear is not rotated about its own axis, the internal gear and the sun gear are integrally rotated together at the same rotational speed and without being rotated relative to each other. On the other hand, when the planetary gear is rotated about its own axis, the internal gear and the sun gear are differentially rotated in accordance with rotational speed of the planetary gear (see Official Gazette of Japanese Patent Application Laid-Open No. H09-112657).

In the above-mentioned conventional differential gear apparatus, there is such a problem that when the respective pitch circle diameters of the internal gear and the sun gear are determined, the ratio of rotation torques (torque bias ratio) transmitted to the internal gear and the sun gear is primarily determined and the ratio is unchangeable. For example, in case the respective circle pitch diameters of the internal gear and the sun gear are represented by D1, D2, respectively, the torque bias ratios are primarily determined as D1: D2.

DISCLOSURE OF THE INVENTION

According to the present invention, there is provided, in order to solve the above-mentioned problem, a differential gear apparatus for vehicles comprising an internal gear which is rotatably disposed, a sun gear which is rotatably disposed with an axis thereof aligned with that of the internal gear, and a planetary gear disposed between the internal gear and the sun gear such that the planetary gear can rotate about its own axis and can revolve, wherein the planetary gear is provided with a first and a second gear part which are different in pitch circle diameter, the first gear part is meshed with the internal gear, and the second gear part is meshed with the sun gear.

The pitch circle diameter of the first gear part may be larger or smaller than that of the second gear part.

If a pitch circle diameter of the internal gear is represented by D1, a pitch circle diameter of the sun gear, by D2, and a pitch circle diameters of the first and second gear parts of the planetary gear, by D3, D4, respectively, either D1/D3≧D2/D4 or D1/D3<D2/D4 can be established with respect to D1 through D4.

BEST MODE FOR CARRYING OUT THE INVENTION

Figure 2:
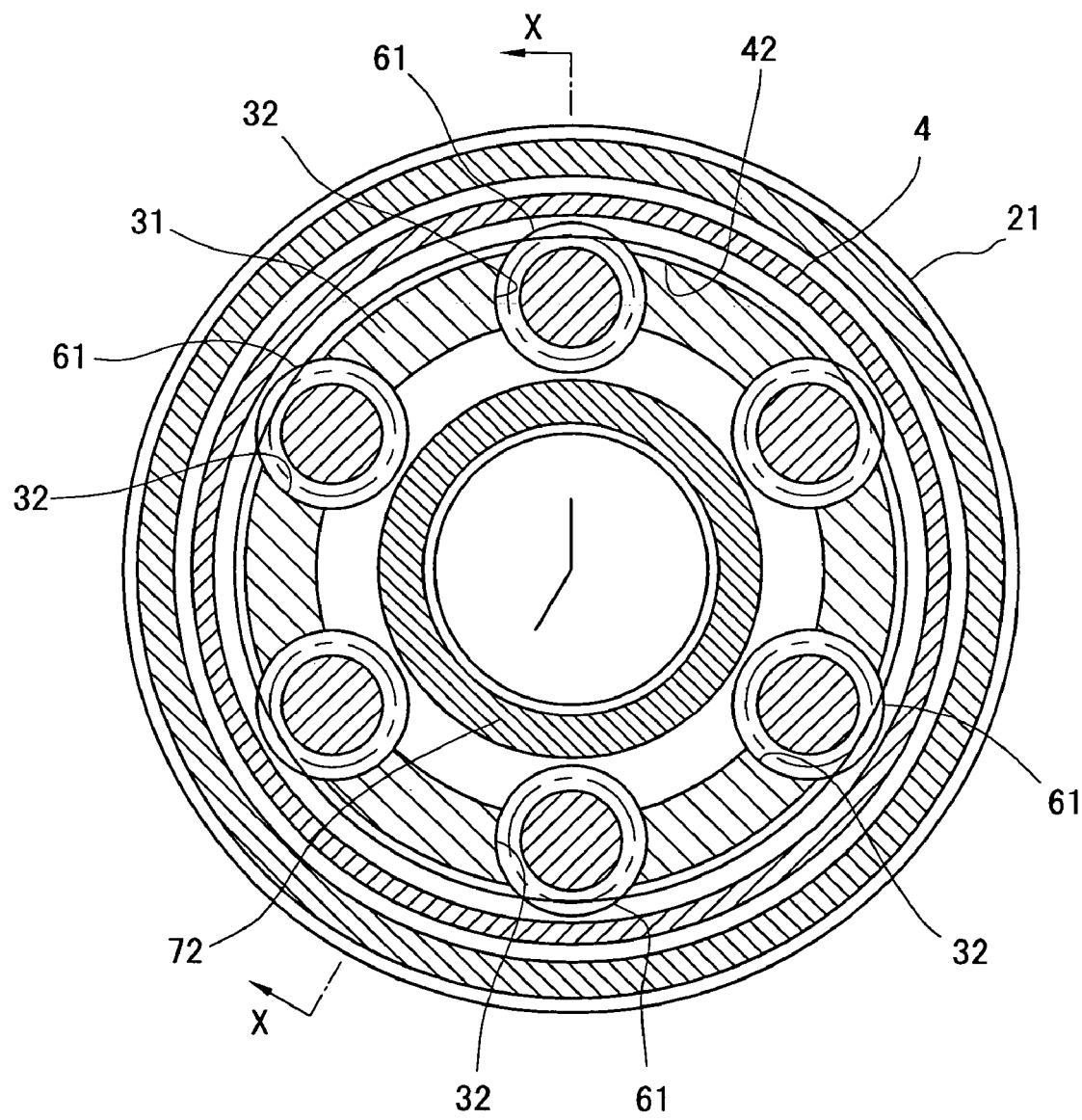
FIG. 2 is a sectional view taken on line X—X of FIG. 1.
Figure 3:
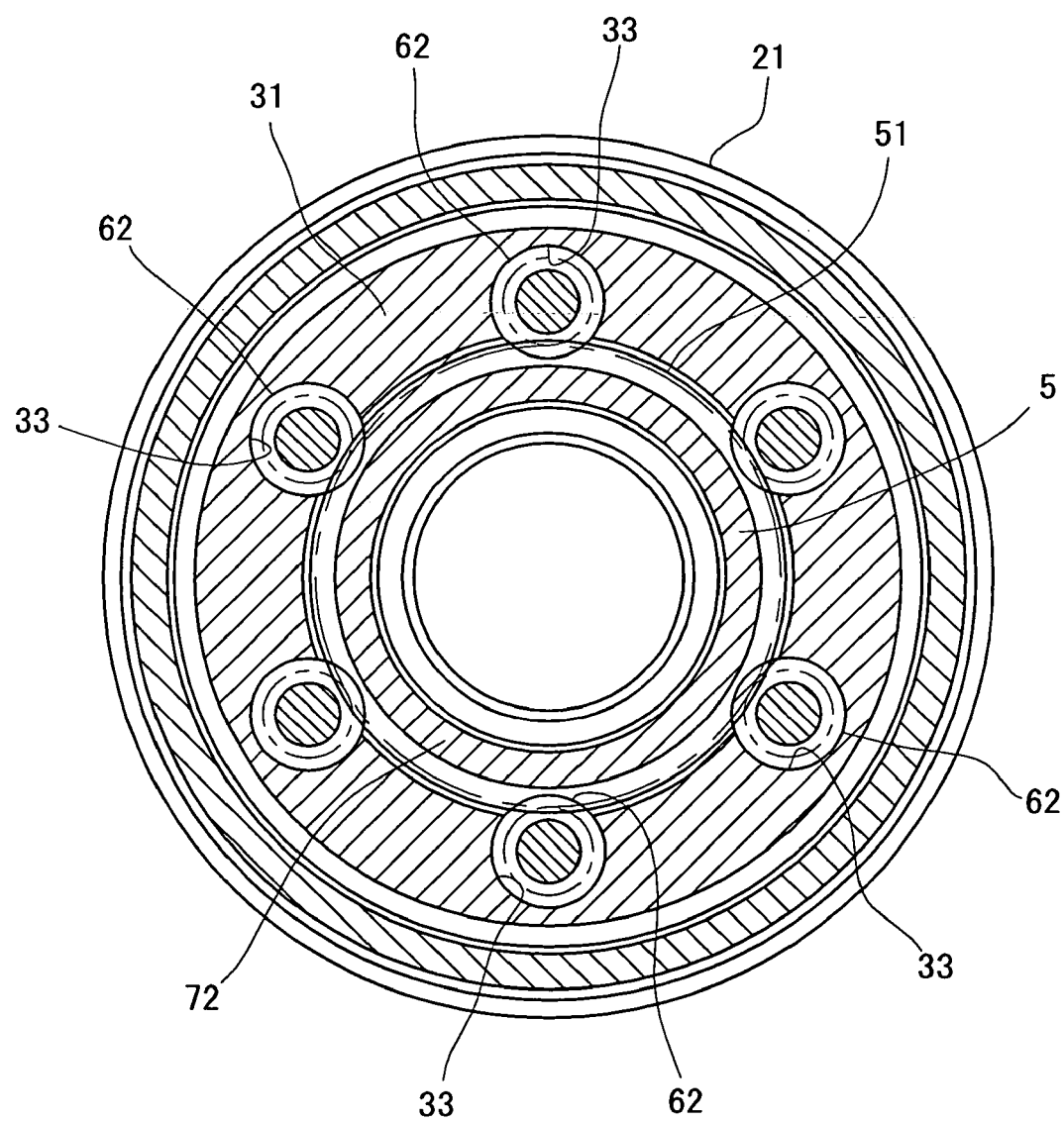
FIG. 3 is a sectional view taken on line Y—Y of FIG. 1.

One embodiment of the present invention will be described hereinafter with reference to FIGS. 1 through 3.

Figure 1:
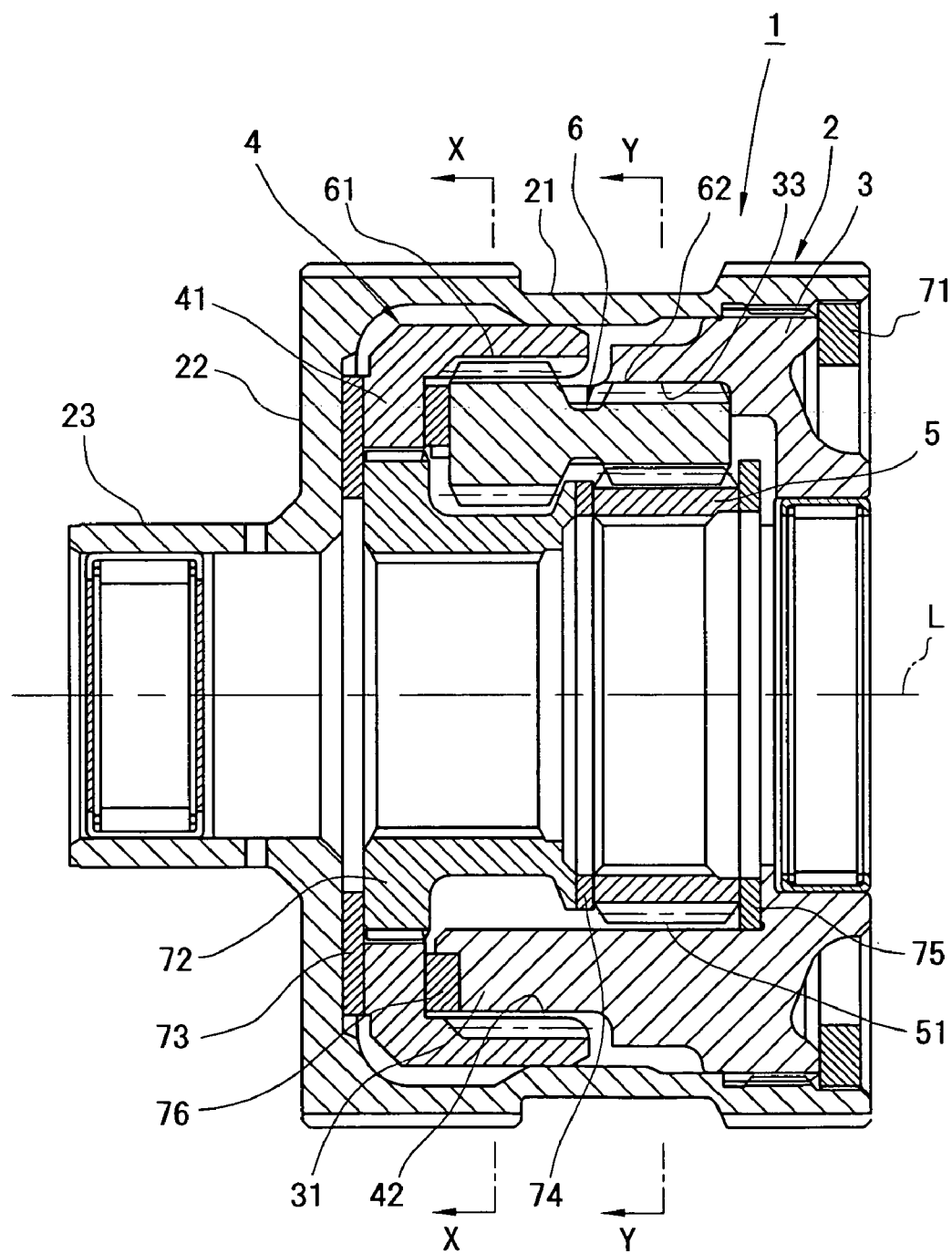
FIG. 1 is a sectional view taken on line X—X of FIG. 2, showing one embodiment of the present invention.

A differential gear apparatus 1 for vehicles according to this embodiment is used, for example, as a center differential gear and mainly comprises, as shown in FIG. 1, a housing 2, a carrier 3, an internal gear 4, a sun gear 5 and a planetary gear 6.

The housing 2 is driven for rotation about a rotation axis L and includes a circular cylindrical main body part 21 with its axis aligned with the rotation axis L. A bottom part 22 is formed on one end part (left end part of FIG. 1) of this main body part 21. A bearing part 23 with its axis aligned with the rotation axis L is formed on the outer side end face of the bottom part 22. A carrier 3 is received in the other end part of the main body part 21. This carrier 3 is non-rotatably connected to the other end part of the main body part 21 by spline fitting and tightly fastened by fastening means which is threadingly engaged with the inner peripheral surface of the main body part 21, so that the carrier 3 is non-movable in the direction of the rotation axis L. First and second output shafts (not shown) are rotatably thrust in the inner peripheral surfaces of the bearing part 23 and the carrier 3, respectively. The housing 2 is rotatably supported by those first and second output shafts about the rotation axis L.

The internal gear 4 is rotatably arranged on the bottom part 22 side within the main body part 21 with its axis aligned with the rotation axis L. An annular protrusion 41 protruding radially inward is formed on one end part (end part on the bottom part 22 side) of the inner peripheral surface of the internal gear 4. A circular cylindrical intermediate member 72 is non-rotatably connected to the inner peripheral surface of the annular protrusion 41 by spline fitting or the like. The annular protrusion 41 and the intermediate member 72 are connected to the bottom part 22 through a washer 73. One end part of the first output shaft is non-rotatably connected to the inner peripheral surface of the intermediate member 72 through spline fitting or the like. The other end part of the first output shaft is connected to, for example, a rear differential gear (not shown). An internal gear part 42 having a helical tooth is formed on the other end face of the inner peripheral surface of the internal gear 4.

The sun gear 5 is rotatably arranged on the carrier 3 side within the main body part 21 with its axis aligned with the rotation axis L. One end face (left end face in FIG. 1) of the sun gear 5 is in contact with the intermediate member 72 through a washer 74 and further in contact with the bottom part 22 through the intermediate member 72 and the washer 73. The other end face of the sun gear 5 is in contact with the carrier 3 through a washer 75. Accordingly, the sun gear 5 is almost non-movably in the direction of the rotation axis L. An external gear part 51 having a helical tooth is formed on the outer peripheral surface of the sun gear 5. This external gear part 51 is same in gear specifications such as module, pressure angle, helical angle, etc. as the internal gear part 42 excepting the number of teeth and the helical direction. The number of teeth of the external gear part 51 is smaller than the number of teeth of the internal gear part 42. Accordingly, the outside diameter of the external gear part 5 is smaller than the inside diameter of the internal gear part 42. One end part of the second output shaft is non-rotatably connected to the inner peripheral surface of the sun gear 5 by spline fitting or the like. The other end part of the second output shaft is connected to, for example, a front differential gear (not shown).

A circular cylindrical supporting part 31 is formed on the end face on the bottom part 22 side of the carrier 3. This supporting part 31 is disposed with its axis aligned with the rotation axis L. A plurality (six in this embodiment) of first receiving holes 32 extending parallel to the rotation axis L are arranged on the forward end face of the supporting part 31 at equal intervals in the peripheral direction of the supporting part 31. As shown in FIG. 2, the inside diameter of each first receiving hole 32 is set to be larger than the thickness of the supporting part 31, and the side parts on the outer side and the inner side of the first receiving hole 32 in the radial direction of the supporting part 31 are open to outside at the outer peripheral surface and the inner peripheral surface of the supporting part 31, respectively. The first supporting hole 32 extends from the forward end face of the supporting part 31 to an intermediate part of the supporting part 31. A second receiving hole 33 is formed in a bottom part of the first receiving hole 32 with its axis aligned with that of the first receiving hole 32. The inside diameter of the second receiving hole 33 is set to be smaller than that of the first receiving hole 32. As shown in FIG. 3, the side part of the second receiving hole 33 on the radially inner side of the supporting part 31 is open to outside at the inner peripheral surface of the supporting part 31.

A first gear part 61 is formed on one end part (left end part of FIG. 1) of the planetary gear 6 and a second gear part 62 is formed on the other end part. The first gear part 61 is rotatably fitted to the first receiving hole 32 and meshed with the internal gear part 42 of the internal gear 4 at the outer side opening part of the first receiving hole 32. The second gear part 62 is rotatably fitted to the second receiving hole 33 and meshed with the external gear part 51 of the sun gear 5 at the inner side opening part of the second receiving hole 33. Owing to this arrangement, when the housing 2 is driven for rotation, its rotation is transmitted to the planetary gear 6 through the carrier 3 and transmitted further to the internal gear 4 and the sun gear 5 from the planetary gear 6. When the planetary gear 6 is not rotated about its own axis, the internal gear 4 and the sun gear 5 are integrally rotated at the same rotational speed. On the other hand, when the planetary gear 6 is rotated about its own axis, the internal gear 4 and the sun gear 5 are rotated differentially in according with the rotational speed of the planetary gear 6.

As apparent from a fact that the first gear part 61 and the second gear part 62 are meshed with the internal gear part 42 and the external gear part 51, respectively, the first and second gear parts 61, 62 have the same gear specifications except that their number of teeth is different and their helical direction is different. The number of teeth of the first gear part 61 is larger than the number of teeth of the second gear part 62. If the numbers of teeth of the internal gear part 42, the external gear part 51, the first gear part 61 and the second gear part 62 are represented by N1, N2, N3 and N4, respectively, the following formula can be obtained.

$$N1 > N2, N3 > N4$$

and the numbers N1 through N4 of teeth are determined so that the following equation can be established.

$$N1/N3 = N2/N4$$

Moreover, since the gear parts 42, 51, 61, 62 are same in module and helical angle, if the pitch circle diameter (meshing pitch circle diameter with respect to the internal gear part 42) of the internal gear part 42 is represented by D1, the pitch circle diameter (meshing pitch circle diameter with respect to the second gear part 62) of the external gear part 51, by D2, the pitch circle diameter (meshing pitch circle diameter with respect to the internal gear part 42) of the first gear part 61, by D3, and the pitch circle diameter (meshing pitch circle diameter with respect to the eternal gear part 51) of the second gear part 62, by D4, respectively, the following formula can be established.

$$D1 > D2, D3 > D4$$

$$D1/D3 = D2/D4$$

Thus, in this differential gear apparatus 1, the torque bias ratio as a ratio between the rotation torque transmitted to the internal gear 4 and the rotation torque transmitted to the sun gear 5 is 50:50. That is, rotation torques having the same magnitude are transmitted to the internal gear 4 and the sun gear 5, respectively.

The respective pitch circle diameters D1, D2, D3 and D4 of the internal gear part 42, the external gear part 51, the first gear part 61 and the second gear part 62 can also be set such that the following formula can be established.

$$D1/D3 > D2/D4$$

They can also be set such that the following formula can be established.

$$D1/D3 < D2/D4$$

In the former case, the rotation torque transmitted to the internal gear 4 is larger than the rotation torque transmitted to the sun gear 5. In the latter case, the rotation torque transmitted to the internal gear 4 is smaller than the rotation torque transmitted to the sun gear 5.

Since the first and second gear parts 61, 62 are opposite to each other in helical direction, the acting direction of the thrust force generated in the planetary gear 6 due to meshing engagement between the internal gear part 42 and the first gear part 61 is equal to the acting direction of the thrust force generated in the planetary gear 6 due to meshing engagement between the external gear part 51 and the second gear part 62. In this embodiment, the helical directions of the first and second gear parts 61, 62 are determined such that when the housing 2 is driven for rotation in such a manner as to advance the vehicle, the left end face of the planetary gear 6 is pressed against the bottom part 22 by the thrust force acting on the planetary gear 6, through the washer 76, the annular protrusion 41 of the internal gear 4 and the washer 73. Of course, conversely, the helical directions of the first and second gear parts 61, 52 may be determined such that a thrust force for pressing the planetary gear 6 against the carrier 3 is generated. In that case, the right end face of the planetary gear 6 is preferably contacted with the carrier 3 through a washer (not shown).

In the differential gear apparatus 1 thus constructed, since the planetary gear 6 is provided with the first gear part 61 and the second gear part 62 which are mutually different two gears and those first and second gear parts 61, 62 are meshed with the internal gear 4 and the sun gear 5, respectively, the torque bias ratio can be selected comparatively freely by appropriately selecting the respective pitch circle diameters.

Moreover, in the differential gear apparatus 1 of this embodiment, since the helical directions of the first gear part 61 and the second gear part 62 are opposite to each other, the acting direction of the thrust force generated due to meshing engagement between the first gear part 61 and the internal gear 4 is same as the acting direction of the thrust force generated due to meshing engagement between the second gear part 62 and the sun gear 5. As a result, the planetary gear 6 is axially pushed by a large force, the left end face of the planetary gear 6 is pressed against the annular protrusion 41 of the internal gear 4 through the washer 76 and further pressed against the bottom part 22 of the housing 2 through the annular protrusion 41 and the washer 73. Thus, during the differential operation, large friction resistance is generated between the planetary gear 6 and the internal gear 4 and between the internal gear 4 and the housing 2. By this, the differential rotation can be restricted. In case the first gear part and the second gear part are same in helical direction, the acting direction of the thrust force generated in the first gear part 61 and the acting direction of the thrust force generated in the second gear part 62 are opposite to each other. Therefore, two thrust forces are offset. As a result, only the small thrust force remained after the offset would act on the planetary gear 6 and therefore, the differential operation restricting performance would be reduced.

The present invention is not limited to the above-mentioned embodiment, and many changes and modifications can be made in accordance with necessity.

For example, in the above-mentioned embodiment, the first and second gear parts 61, 62 are same in gear specifications excepting the number of teeth and the helical direction, and as a result, the pitch circle diameter D3 of the first gear part 61 having a larger number of teeth is larger than the pitch circle diameter of the second gear part 62. However, for example, by making the first and second gear parts different in module, it is possible to make the pitch circle diameter of the first gear part 61 same as the pitch circle diameter of the second gear part 62, while satisfying the conditions of D1/D3>D2/D4 or D1/D3<D2/D4.

INDUSTRIAL APPLICABILITY

A differential gear apparatus for vehicles according to the present invention can be used a front differential gear or rear differential gear for automobiles, or as a center differential gear for four-wheel drive vehicles.

The invention claimed is:

1. A differential gear apparatus for vehicles comprising an internal gear which is rotatably disposed, a sun gear which is rotatably disposed with an axis thereof aligned with that of said internal gear, and a planetary gear disposed between said internal gear and said sun gear such that said planetary gear can rotate about its own axis and can revolve,
   wherein said planetary gear is provided with a first and a second gear part which are different in pitch circle diameter, said first gear part is meshed with said internal gear, and said second gear part is meshed with said sun gear.

2. A differential gear apparatus for vehicles according to claim 1, wherein if a pitch circle diameter of said internal gear is represented by D1, a pitch circle diameter of said sun gear, by D2, and a pitch circle diameters of said first and second gear parts of said planetary gear, by D3, D4, respectively, D1/D3≧D2/D4 can be established.

3. A differential gear apparatus for vehicles according to claim 1, wherein if a pitch circle diameter of said internal gear is represented by D1, a pitch circle diameter of said sun gear, by D2, and a pitch circle diameters of said first and second gear parts of said planetary gear, by D3, D4, respectively, D1/D3<D2/D4 can be established.

4. A differential gear apparatus for vehicles according to claim 1, wherein said first gear part is larger than said second gear part in pitch circle diameter.

5. A differential gear apparatus for vehicles according to claim 4, wherein if a pitch circle diameter of said internal gear is represented by D1, a pitch circle diameter of said sun gear, by D2, and a pitch circle diameters of said first and second gear parts of said planetary gear, by D3, D4, respectively, D1/D3≧D2/D4 can be established.

6. A differential gear apparatus for vehicles according to claim 4, wherein if a pitch circle diameter of said internal gear is represented by D1, a pitch circle diameter of said sun gear, by D2, and a pitch circle diameters of said first and second gear parts of said planetary gear, by D3, D4, respectively, D1/D3<D2/D4 can be established.

7. A differential gear apparatus for vehicles according to claim 1, wherein said first gear part is smaller than said second gear part in pitch circle diameter.

8. A differential gear apparatus for vehicles according to claim 7, wherein if a pitch circle diameter of said internal gear is represented by D1, a pitch circle diameter of said sun gear, by D2, and a pitch circle diameters of said first and second gear parts of said planetary gear, by D3, D4, respectively, D1/D3≧D2/D4 can be established.

9. A differential gear apparatus for vehicles according to claim 7, wherein if a pitch circle diameter of said internal gear is represented by D1, a pitch circle diameter of said sun gear, by D2, and a pitch circle diameters of said first and second gear parts of said planetary gear, by D3, D4, respectively, D1/D3<D2/D4 can be established.

* * * * *